United States Patent
Rider et al.

(10) Patent No.: US 6,215,553 B1
(45) Date of Patent: Apr. 10, 2001

(54) WIDTH MEASUREMENT OF AN IMAGE-BEARING SHEET

(75) Inventors: Christopher B. Rider, New Malden; David A. Skye, Harpenden; Bruce S. Gowans, Hemel Hempstead, all of (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/464,554

(22) Filed: Dec. 16, 1999

(30) Foreign Application Priority Data

Dec. 24, 1998 (GB) .................................................. 9828439

(51) Int. Cl.⁷ .................................................. G01B 11/08
(52) U.S. Cl. ............. 356/384; 250/559.02; 250/559.26; 396/569; 396/570
(58) Field of Search ...................................... 356/384, 385, 356/383, 386, 387, 429–431; 250/559.02, 559.26, 559.01, 559.06, 559.11, 559.24; 396/569, 570, 568; 702/172

(56) References Cited

U.S. PATENT DOCUMENTS

| | | | |
|---|---|---|---|
| 3,554,109 | 1/1971 | Street et al. | |
| 3,693,021 | * 9/1972 | Lake, Jr. et al. | 356/384 |
| 3,787,689 | * 1/1974 | Fidelman | 250/559.02 |
| 3,937,580 | * 2/1976 | Kasdan | 356/384 |
| 4,506,969 | 3/1985 | Baker | |
| 4,559,452 | * 12/1985 | Igaki et al. | 356/386 |
| 4,967,094 | * 10/1990 | Horton et al. | 250/561 |
| 5,453,825 | * 9/1995 | Lipiz | 356/385 |
| 5,530,260 | * 6/1996 | Arakawa | 250/586 |

* cited by examiner

Primary Examiner—Hoa Q. Pham
(74) Attorney, Agent, or Firm—Frank Pincelli

(57) ABSTRACT

A processed sheet of photographic film is guided into a channel of scanning equipment in which it is subjected to light from an elongate fluorescent tube. Light transmitted through the film is detected by a sensing arrangement in the form of an elongate solar cell strip. The strip is scored so as to divide it into 3 small subsidiary sensors and four longer sensors. All seven sensors form the main light sensor. As the leading edge of the film, which is assumed to be of uniform light density, enters the channel and totally obscures at least one of the subsidiary sensors, that sensor measures the transmittance of the film. This value, together with the reduction in light sensed by the main sensor, is then used to determine the width of the film. The film width is combined with the separately computed film length, to provide a signal used to control the amount of replenishment chemicals to be supplied to a photoprocessor.

24 Claims, 3 Drawing Sheets

WIDTH MEASUREMENT OF AN IMAGE-BEARING SHEET

FIELD OF THE INVENTION

This invention relates to the measurement of the width of a sheet bearing an image. In particular, the invention relates to width measurement of a sheet of photographic material that (i) has an image-bearing portion, and (ii) has a non-image-bearing portion that is of substantially uniform optical density across substantially its entire width.

Although the invention finds particular application in respect of a sheet of material having black and white, high contrast images, for example of the kind used in graphic arts, it is generally applicable to sheet material bearing any kind of image including colour images, including but not limited to those formed on silver halide film and paper, and to images formed using polymers, dyes, inks, or toners.

The term "sheet" is to be understood as encompassing a substantially two-dimensional shape not only of discrete square or other low aspect ratio, but also of elongate, generally rectilinear, shape, thus including, for example, a web or a roll, of photographic material for example.

BACKGROUND OF THE INVENTION

For convenience, the invention will be described with reference to a sheet of photographic material, but it is to be understood that the method and apparatus is also applicable to the measurement of the width of other material as described above.

For the accurate control of a photographic processing machine, it is necessary to replenish the processing baths to compensate for consumption of the chemicals therein as the photographic material is processed, and thus to maintain the chemical activity of the processing solutions. Improvements in the formulations of the processing solutions, and a desire to reduce the volume of liquid effluent which is produced, have lead in recent years to a gradual reduction in the rate and amount of replenishment required. This, in turn, has lead to a requirement for increasingly accurate control of the replenishment process. For black and white materials, the volume of replenishment solution required, for the developer and the fixer stages of the processing is a function of the area of the material processed and of the amount of developed image on the material. In many graphic arts, that is to say high-contrast black-and-white, processing machines, where a variety of material widths may be used, the area is usually approximately determined by measuring the sheet width and the length, for example by means of microswitches extending across the width of the entrance to the processor that are activated by the passing material. The length is determined by the time for which the switches are activated multiplied by the transport speed of the processor. The width is determined by the number of microswitches that are activated. For example, if there are four microswitches equi-spaced across the entrance to the processor and three are activated, then the width of the material relative to the maximum possible width must be between 40% and 80%, and the width is stated as 60%±20%.

Another method of obtaining the width and length, and thus the image area, is to have the image exposing apparatus, for example, an image-setter, transmit this information to the processor, as is the case, for example with the Linotype Hell Herkules PRO/Advantage™ imagesetting system. The processor is then able to use the information from the image-setter to enable accurate replenishment and thus to maintain good process control. In the case of the Advantage™ processor, errors in the delivery of replenishment per unit area of film processed were reduced to about 5% of the volume delivered in order to maintain stability at the very low replenishment rates used.

U.S. Pat. No. 4,506,969 (Pako Corporation) discloses a film width and transmittance scanner system of a graphic arts film processor in which the transmittance of light through the film is measured along a line or set of parallel lines positioned at a skew angle with respect to the direction of film travel. Switches are employed to note passage of the leading and trailing edge of the film through the scanner. The scanner may employ a single light source and a single detector, each of which extends across the width of the film, but there is also disclosed use of a larger number of detectors extending sequentially across the width of the film in order to reduce the path length which the scanner adds to the processor. The scanner produces signals that are used in the control of a replenishment system of the processor.

U.S. Pat. No. 3,554,109 (Logetronics Inc) discloses an image monitoring and control system for determining the optical densities developed in sheets of image-bearing photosensitive material, for controlling the feeding of replenishment chemicals to a film processor. The system includes a scanner having twelve light communicating stations for sequentially receiving light from a corresponding plurality of sources that has passed through successive portions across the width of a developed film.

PROBLEM TO BE SOLVED BY THE INVENTION

To improve the accuracy of the microswitch measuring method to 5% of the full width of the processor, it would be necessary to use nineteen microswitches across the processor entrance. This would not only be very expensive, but would also reduce reliability due to the many moving parts.

The method of forwarding information from the exposing apparatus to the processing apparatus is only effective when the processor is linked in some way to the exposing device, for example by being on-line therewith, and where: the exposing device actually measures the width and exposed image area; the processor is equipped with the correct data link to receive the information from the exposing device; and the processor has the algorithms necessary to use the information to convert it into a control signal for the processing bath replenishment systems. For off-line systems where the processor is not linked to an associated exposing device, material to be processed may have come from one of a number of different exposing devices, may come in various widths and lengths, and may be of one of several different film types. Furthermore, the sheet material may be introduced into the processor anywhere across its entrance, that is to say, it could be put down the left- or right-hand side or down the centre of the processor.

It is one object of the present invention to provide for inexpensive yet accurate measurement of the width of sheet material.

It is another object of the present invention to provide for determination of the exposed area of photographic material during processing.

SUMMARY OF THE INVENTION

In accordance with one aspect of the present invention, there is provided a method of measuring the width of a sheet of material that (i) has an image-bearing portion, and (ii) has a non-image-bearing portion that is of substantially uniform optical density across substantially the entire width of the sheet, wherein:

the sheet is guided longitudinally through a channel;

light from an elongate source is directed into the channel substantially perpendicularly to the direction of movement of the sheet;

said light is received (i) by an elongate main sensor arrangement whose length is greater than the width of the sheet, and whose response to the light is substantially uniform across the width of the sheet; and (ii) by an elongate subsidiary sensor arrangement whose length is less than 90% of the width of the sheet;

wherein the transmittance, or reflectance, of the non-image-bearing portion of the sheet is determined from the difference of an output signal of the subsidiary sensor arrangement when (i) the sheet is in the channel and the light received is from the non-image-bearing portion, and (ii) the light received thereby is in the absence of the sheet in the channel; and wherein the width of the sheet is determined from the measured transmittance, or reflectance, and from the difference of the output signal of the main sensor arrangement when (i) the sheet is in the channel and the light received is from the non-image-bearing portion, and (ii) the light received thereby is in the absence of the sheet in the channel.

Preferably, the method is operated in transmissive, rather than reflective, mode, that is to say the light is arranged to be received by the sensor arrangements after it has been transmitted through the sheet.

The main sensor arrangement may comprise a single sensor. Alternatively it may comprise two or more discrete sensors, which may be mounted contiguously co-linearly, or may be offset from one another in the direction of movement of the sheet and/or in a direction substantially perpendicularly to the plane of the sheet material.

Preferably the subsidiary sensor arrangement comprises a plurality of discrete sensors, and the difference in time between the leading edge of the sheet beginning to obscure a first and then at least one other of said subsidiary sensors is determined, and a correction is applied to the measured width thereby to compensate for any errors therein due to the sheet being skewed in the channel. The 'length' of a sensor arrangement comprising more than one sensor is to be understood as the sum of the individual lengths of the discrete sensors in a direction in the plane of the sheet perpendicularly to the direction of movement thereof.

Although the main and subsidiary sensor arrangements may be separate from each other, it is also envisaged that the subsidiary sensor arrangement can form part of the main sensor arrangement.

The accuracy of the width measurement may be enhanced by using a signal from an associated photographic processor that is representative of any skew angle of the sheet width as determined from the output of the sensor arrangements located at the input to the processor.

The method of the invention may be used in association with, including to control the operation of, an associated photographic processor. Thus, in a further aspect of the invention, there is provided a method of controlling a photographic processor, wherein a sheet of material is processed in the processor and passed therefrom into apparatus for determining the width of the sheet, the width of the sheet is determined by a method according to said one aspect of the invention, a first signal dependent on the width of the sheet material is used to derive a second signal that is representative of the area of the sheet, and wherein said second signal is used in the control of the operation of the processor.

Thus, the subsidiary sensor arrangement is arranged to provide a measurement of the transmittance, or reflectance, of the sheet, and this value is used in combination with the decrease in signal from the main sensor arrangement that occurs when the sheet is present in the channel. As set out above, the length of the subsidiary sensor arrangement may be up to about 90% of the width of the sheet. However, advantageously, this length may be less than about 50%, preferably less than about 25%, more preferably less than about 10%, and most preferably does not exceed about 5%, of the width of the sheet. The subsidiary sensor arrangement may be formed from a plurality of discrete sensors, preferably numbering three, distributed, advantageously uniformly, across the channel. The minimum number of sensors (or in general the minimum length of the subsidiary sensor arrangement), and their positioning laterally of the channel, are chosen in relation to the minimum width of sheet to be sensed, that is to say the minimum sheet width for which the sensing arrangement is rated to operate, such that at least one of the subsidiary sensors will be fully obscured from the light source by the sheet irrespective of the lateral positioning of the sheet as it passes through the channel. For cost and complexity reasons, the fewest number of subsidiary sensors is chosen, but care has to be taken so as not to compromise the efficiency of ensuring that at least one of them is fully obscured by a sheet of minimum width.

The method and apparatus of the present invention may also be used, in conventional manner, to determine information relating to the optical density of the image on the sheet of material.

It is to be noted that the measured area and image-density information may be used for more than just replenishment of processing tanks in silver halide processors. It may be also be used to control the function and replenishment of other "subsystems" which are attached to the processor. These may include, for example, the timing of the replacement of filters in filtration systems according to area or image amount. They may also include electrolytic silver recovery systems which may be coupled to the fixing bath to remove silver from the bath as it is produced through the fixing of silver halide materials. In this case, the plating current may depend on the amount of image processed, and not just on the area processed. Furthermore, in toner- or ink-based imaging systems, the image amount data may be accumulated and used to signal the imminent exhaustion of and need for replenishment of the toner or ink cartridge. For the purposes of this invention, therefore, the word "processor" is defined to include any subsystems which may be attached to the processor and which may also use the sheet area or image data information provided by the scanner.

In accordance with another aspect of the present invention, there is provided apparatus for measuring the width of a sheet of material that (i) has an image-bearing portion, and (ii) has a non-image-bearing portion that is of substantially uniform optical density across substantially its entire width, comprising:

a channel for receiving the sheet;

an elongate source of light arranged to direct light into the channel;

means for guiding the sheet through the channel whereby the sheet receives light transversely to the plane thereof;

means defining an optical aperture of predetermined minimum width for passage of the light across the channel transversely to the direction of transport of the sheet;

an elongate main light sensor arrangement whose length is equal to or greater than said minimum width of the optical aperture and whose response to the light is substantially uniform across the width of the sheet, and an elongate subsidiary light sensor arrangement whose length is less than 90% of said minimum width of the optical aperture, the sensor arrangements being mounted so as to receive transmitted, or reflected, light from the sheet in the channel;

means for determining the transmittance, or reflectance, of the sheet from light received by the subsidiary sensor arrangement when (i) the sheet is in the channel and the light received is from the non-image-bearing portion, and (ii) the light received thereby is in the absence of the sheet in the channel; and means for determining the width of the sheet from (a) light received by the main sensor arrangement when (i) the sheet is in the channel and the light received is from the non-image-bearing portion, and (ii) the light received thereby is in the absence of the sheet in the channel, and (b) from the measured transmittance, or reflectance.

The optical axial plane of the scanner may be defined as that plane which cuts the longitudinal axis of the light source and the centre line of the detector strip. Preferably, the scanner is mounted so that the optical axial plane is approximately perpendicular to the plane of the sheet as is passes through the processor's dryer section. An optical aperture of the scanner is the outer envelope of all possible ray paths across the channel through which the sheet passes in a plane perpendicular to the optical axial plane. The key components of the scanner which determine the optical aperture are:

1. The light source
2. The lower aperture plate
3. The upper aperture plate
4. The main detector The minimum optical aperture is defined as the minimum length of all optical apertures measured in a direction perpendicular to the sheet transport direction in the plane of the sheet as it passes through the dryer. For reasons that will become apparent when the apparatus is described in more detail below, the lower aperture plate is generally shorter than the light source and hence defines the optical aperture at its lower extreme. At its upper extreme, it is usually the upper aperture plate (if present) which defines the optical aperture. If the upper aperture plate is not present, it will be the main detector itself, which defines the optical aperture. The minimum optical aperture will then be defined by the length of the shorter of these two defining apertures.

It is to be understood that the apparatus of the invention may be used in the method thereof.

Advantageously, the light source is a fluorescent tube, and the apparatus can be arranged, by suitable choice of optical apertures for example, so that only substantially uniform light from the intermediate section of the length of the tube is used in the measurements.

Preferably, the subsidiary sensor arrangement comprises at least three discrete sensors that are dispersed along the length of the main sensor arrangement, alternating with discrete sensors that form the main sensor arrangement.

The main and subsidiary sensor arrangements are preferably co-linear, but they may be mounted linearly offset from one another.

Preferably, the sensor arrangements are formed from a solar cell, preferably an amorphous silicon solar cell strip. Advantageously, a single strip is used, being scored transversely so as to divide it into discrete alternating main and subsidiary sensors.

If the image is in colour, the scanner may be adapted to provide information related to amounts of image-forming substances on the sheet in each hue present. This is most practically achieved by using the same single white light source with, for example, three parallel linear detector arrangements, each spectrally filtered appropriately to receive light modulated by one or more of the image-forming substances present on the sheet being scanned.

The use of a continuous extended light source, such as a fluorescent tube, and a continuous extended light sensor, such as a solar cell strip, together with apertures defining the lengths over which light reaches the sheet from the source and over which light reaches the sensor arrangements from the sheet, provide apparatus that is both inexpensive and robust. Furthermore, the design is easily adapted to reduce edge effects which are common in many optical systems. Edge effects are apparent as reduced sensitivity when measuring image data which passes through the scanner towards the edges of the optical aperture. In other words, the effect of a small piece of black film in the centre of the channel can be greater than the effect produced by the same piece of film if it were to pass down the edge of the channel. The result of such a variation is generally to reduce the amount of exposed image area detected. These edge effects can be eliminated, or at least reduced by suitable mechanical arrangement of the construction of the apparatus. Thus, advantageously, each aperture is arranged to be wider than the maximum width of the film sheet to be used, and the total length of the sensor arrangements is arranged to be greater than the width of the apertures. This feature is explained more fully below.

In one preferred embodiment of the method of measuring the width of an image-bearing sheet of material, a linear sensing arrangement comprises an elongate main sensor and a plurality, preferably three, of significantly smaller subsidiary sensors. In this method, and using the associated apparatus, at least one of the subsidiary sensors is arranged to measure the transmittance of the leading, or trailing, edge of the sheet of material. In certain cases, such as in the graphic arts industry, it is reasonable to assume that the transmittance of the sheet is uniform across the width, and along the first 10 mm (say) of its length. The sheet is arranged to leave the photographic processor and be guided into the channel of width-scanning equipment. Light from the elongate source is directed into the channel substantially perpendicularly to the direction of movement of the sheet. The light is received (i) by an extended linear main sensor whose length is greater than the width of the sheet, and (ii) by at least one smaller subsidiary sensor that is substantially totally obscured from the light source by the sheet. The width of the sheet is calculated from a measurement of the transmittance of the leading edge (obtained by the fully-obscured subsidiary sensor), and from the overall drop in signal from the full width, main sensor. However, should the geometry and construction of the scanning equipment and the width of the sheet of material be such that none of the subsidiary sensors is fully covered by the film, then the transmittance measured thereby will not be reliable.

Thus, in accordance with a further aspect of the present invention, there is provided a method according to the said one aspect, comprising the step of measuring the light transmitted through, or reflected from image-bearing sheets of variable widths, wherein the main light-sensing arrangement comprises two main sensors and the subsidiary sensor arrangement comprises an associated subsidiary sensor, wherein the subsidiary sensor is arranged to measure the transmittance, or reflectance, of the sheets, wherein the main and subsidiary sensors are mounted across the width of the sheets as they pass through the channel (a) with the subsidiary sensor being located intermediate the two main sensors, or (b) with the main sensors abutting one another and with the subsidiary sensor displaced therefrom along the direction of movement of the sheet and located symmetrically with respect to the abutment of the main sensors; wherein the signal output of each of the main sensors is measured in the presence of a sheet in the channel, wherein the expected signal output of each of the main sensors from the sheet is calculated on the assumptions that (i) the sheet is located in the channel at the furthest position away from the sensors and that (ii) the width of the sheet across the channel is such that the subsidiary sensor is substantially obscured from the light source, and wherein said calculated values are compared with said actual values, thereby to determine the reliability of the transmittance, or reflectance, of the sheet, as measured by the subsidiary sensor.

The value of the transmittance, or reflectance, as measured by the subsidiary sensor, is considered as being unreliable, if the actual measured signal from either associated main sensor is greater than a pre-determined value; otherwise, the value is considered reliable.

Thus, the method of this aspect of the present invention uses the signal from a main sensor on each side of the subsidiary sensor to ascertain the reliability of the transmittance, or reflectance, obtained from the subsidiary sensor. To achieve this, a calculation is made as to the expected reduction in light received by each of the main sensors in the event that the sheet is in the least favourable position in the channel for accurate transmittance, or reflectance, measurement.

It will be appreciated that the method of the invention may provide the value of the transmittance of the film when the light is received by the sensors after having passed through the sheet, or it may provide the reflectance if the light received has been reflected off the surface of the sheet.

Advantageously, more than one subsidiary sensor, and preferably three, is provided, each of which has one of an associated pair of main sensors located on each side thereof. The calculation and measurements set out above are then carried out in respect of each arrangement of subsidiary sensor and associated pair of main sensors, and the transmittance value that is taken is that which is validated as being reliable, as set out above.

Although the method may be carried out in respect of a single sheet of a series of sheets it is preferred that the actual value of each of the main sensors is calculated for each sheet for comparison with the transmittance value calculated from the output signal of the subsidiary sensor.

If the actual value of light intensity measured by each of a pair of main sensors is equal to or less than said calculated value, then the transmittance, or reflectance, measured by the interposed subsidiary sensor is validated, since in these circumstances, that subsidiary sensor must be totally obscured by the film from the light source. Conversely, if the actual value of light reduction measured by at least one of the pair of main sensors is greater than said calculated value, then the transmittance, or reflectance, measured by the interposed subsidiary sensor has not been validated.

The width of the sheet can then be determined from the measured validated transmittance, or reflectance, together with the actual values of the light reduction measured by the main sensors. The length of the sheet may be determined by any suitable means. For example, this may be obtained from microswitches distributed across the entrance of an associated photoprocessor, which give the time interval between activation of the switches by the leading and the trailing edge of the sheet as it passes therethrough. This information, together with the, known, speed of transport of the sheet through the processor, can then be used to determine the length of the sheet. The area of the sheet may then be determined, and a signal corresponding to this can be used in control of the operation of the processor. The signal may be used, for example, to control (i) replenishment of photographic processing solution that is consumed in at least one stage of the processor, and/or (ii) recovery of silver from the processor, and/or (iii) replacement of a filter of the processor.

In the case where a validated transmittance, or reflectance, cannot be obtained from any subsidiary sensor, then a historical average validated value may be used instead. Alternatively, in such circumstance, the sheet width may be determined by means associated with a photoprocessor to which the sensing arrangement is linked. For example, the mechanical input switches of an associated photographic processor may be used to obtain a crude estimate of the width of the sheet. Such switches are disposed across the entrance to the processor and serve to activate its operation upon introduction of a sheet of photographic material. By determining how many of those switches have been activated, a crude estimate can be made, not only of the width of the film but also of its position across the entrance to the processor and thus across the channel of the sensing arrangement. This information may allow the transmittance, or reflectance, as measured by a particular one of the subsidiary sensors to be taken as a validated value, even though this would not be indicated from the signals received from an associated pair of main sensors when using a multi-sensor arrangement. It will be appreciated, however, that such a technique is only applicable where output signals can be obtained from the processor input switches and can be supplied to the sensing equipment.

The height of the channel in a direction perpendicular to the plane of the sheet is preferably greater than 5 mm, and more preferably greater than about 10 mm. This ensures that even the most rigid of sheet material of the shortest length, typically fed through a photoprocessor for example, will drop out of the apparatus under its own weight, having left the drive rollers from the dryer section.

It is desirable to include in the apparatus a reference sensor arrangement that is mounted to receive light from the source without any interference from the sheet of material and that is arranged substantially to eliminate any effect on the main and subsidiary sensor arrangements of any variation in output of light from the source.

The sheet of photographic material will be driven at constant speed through the associated photoprocessor, drive being provided by one or more rollers or sets of roller, until the sheet falls freely out of the processor. It is advantageous to scan the image-bearing sheet optically to determine its integrated transmittance, for example in order to derive a signal for controlling replenishment of the chemicals in the processor. Our contemporaneously-filed patent application (case reference 11013) discloses a method in which a free-standing optical scanner may be located after the dryer section of the processor to make this determination. The scanner does not need drive rollers, and thus as the sheet leaves the processor it accelerates freely through the scanning region. The method of this co-pending application analyses the stored output signals of the scanner so as to correct the transmittance values for the changing area of the sheet associated with each value.

ADVANTAGEOUS EFFECT OF THE INVENTION

The invention allows width measurement of a sheet to be made, either by the transmission of light there through or by reflection of light therefrom, in a simple, accurate and inexpensive manner.

In U.S. Pat. No. 4,506,969, the scanner is necessarily skewed with respect to the direction of transport of the film, with a corresponding increased path length, and thus footprint, of the processor and increased time taken to process the film. Furthermore, the minimum gap between successive sheets of film is larger then required by the present invention, in order to ensure that only one sheet is in the scanner at any time. These disadvantages can only be alleviated using the embodiment disclosed of several shorter scanners, which itself introduces problems of ensuring proper alignment of the plurality of scanners. This invention does not allow the width of the film to be determined until the trailing edge has left the scanner. For a long roll of film, this may mean that replenishment of the fixer, for example, may not be carried out until after it has become undesirably depleted, unless potentially inaccurate or inconvenient remedial steps are taken. In accordance with the present invention, on the other hand, width is determined during passage of the leading edge of the sheet through the apparatus, allowing earlier assessment of the replenishment requirements.

U.S. Pat. No. 3,554,109 employs a photomultiplier and fibre optic bundles, as well as a potentially unreliable moving drum, each of which adds significantly to the cost of the apparatus in comparison with the simpler arrangement of the present invention.

The method of the further aspect of the present invention thus allows the measured transmittance, or reflectance, of a sheet to be used with confidence, as being measured by a sensor that is confirmed to be subject totally to light transmitted through, or reflected from, the film.

BRIEF DESCRIPTION OF THE DRAWINGS

A method of, and apparatus for, measuring the width and light transmittance of a sheet of material, will now be described, by way of example, with reference to the accompanying drawings, in which.

DETAILED DESCRIPTION OF THE INVENTION

Figure 1:
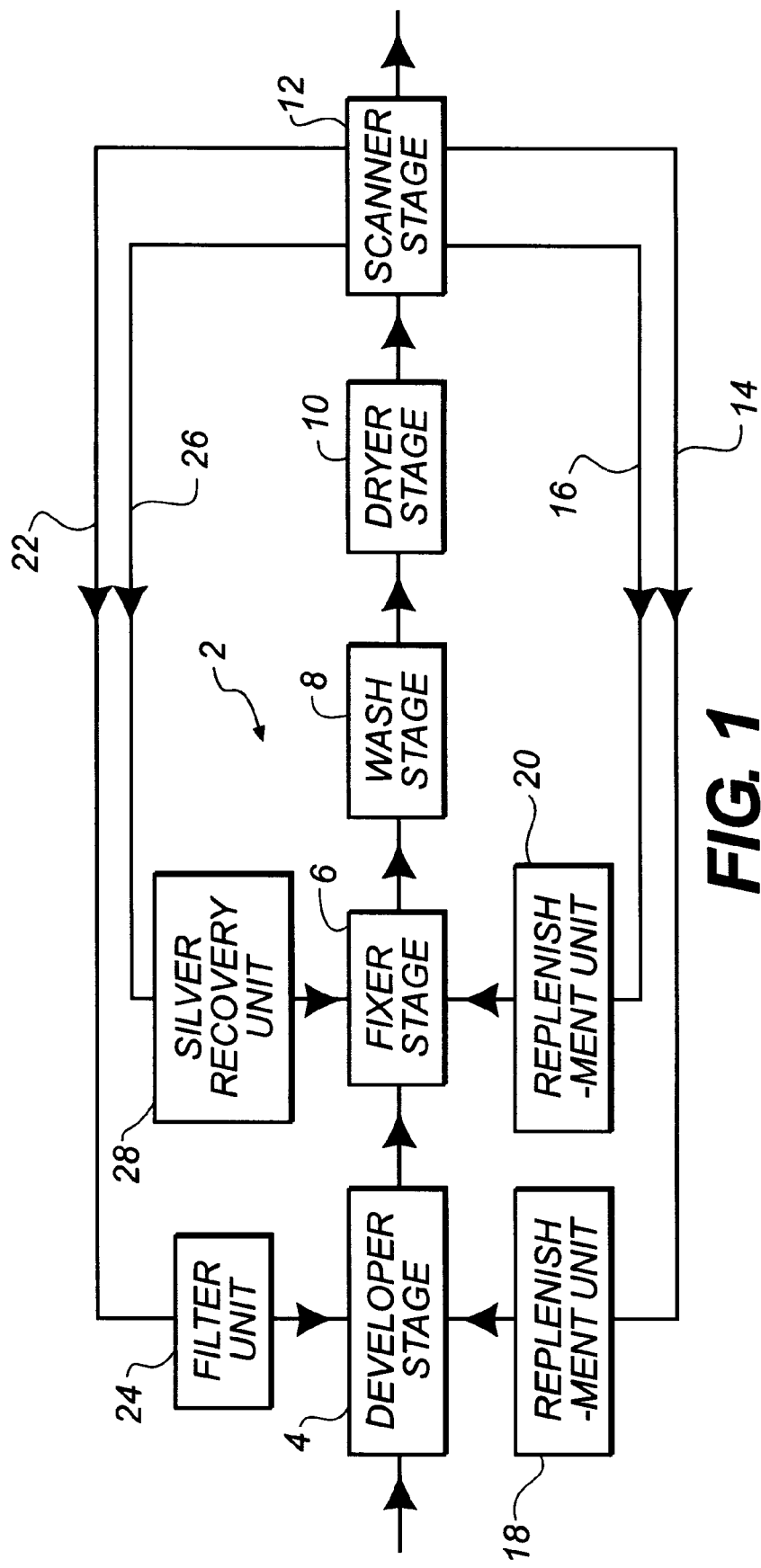
FIG. 1 is a schematic illustration of the apparatus in association with photographic processing apparatus.

Referring to FIG. 1, a conventional graphic arts processor 2 for black-and-white discrete sheets of film (not shown) comprises sequential processing stages in which the film passes from a developer stage 4 through a fixer stage 6, then to a wash stage 8 and finally into a dryer stage 10. Mounted after the dryer stage 10 is a separate scanner stage 12 that measures the width of the film. Microswitches (not shown) at the entrance to the processor 2 are used to measure the length of the film, and the area of film that has been processed is calculated and then fed back to control various operations of the processor 2. As shown, control signals are sent along lines 14 and 16 to respective replenishment units 18 and 20 to control the quantity of replenishment solution that is supplied to respective developer and fixer stages 4 and 6. A further control signal is sent along line 22 to control replacement of filters in a filter unit 24 that removes by-products from the developer stage 2. Yet another control signal is sent along line 26 to a silver recovery unit 28 that removes silver from the fixer stage 6.

Figure 2:
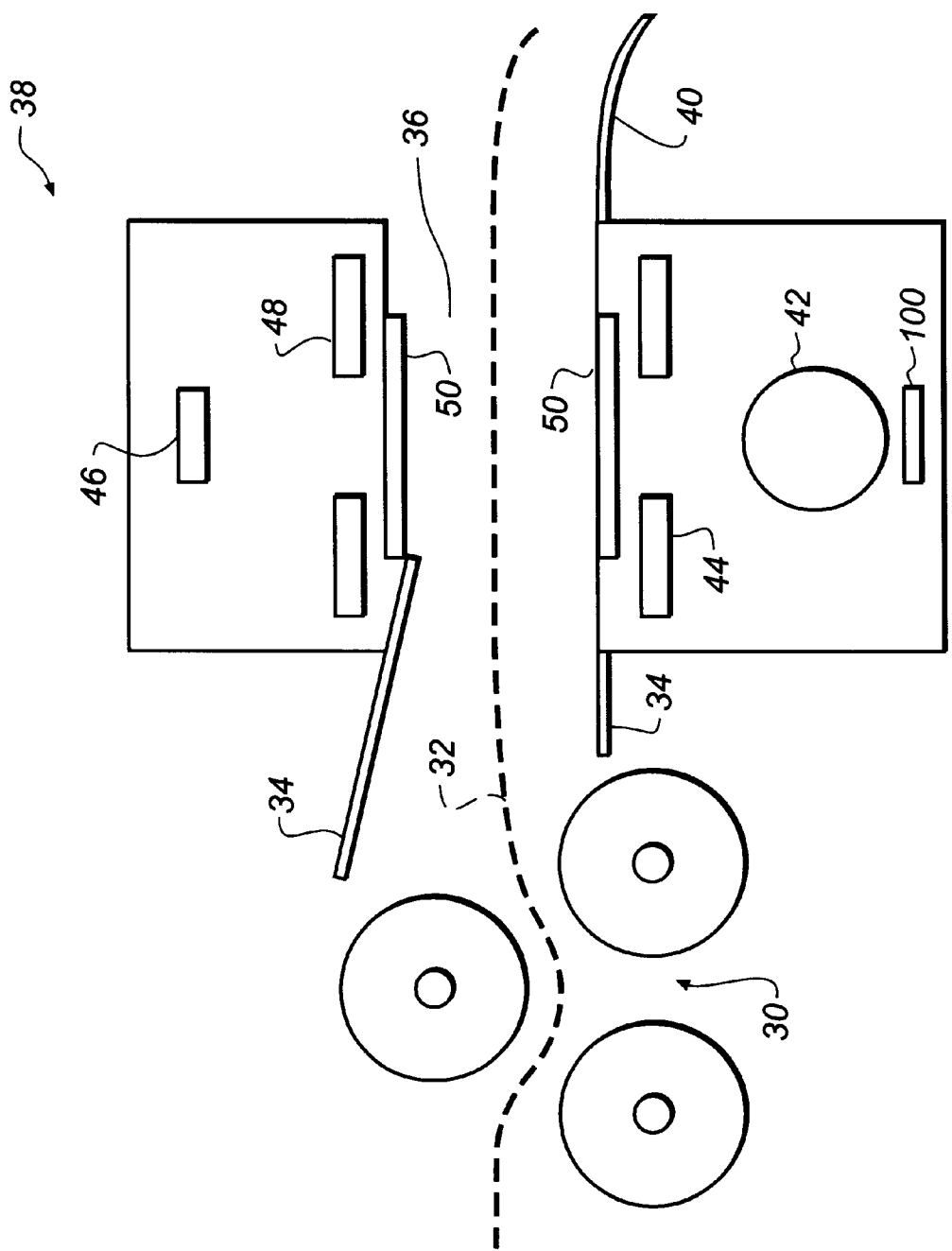
FIG. 2 is a schematic cross-sectional elevation of the measuring apparatus.
Figure 3:
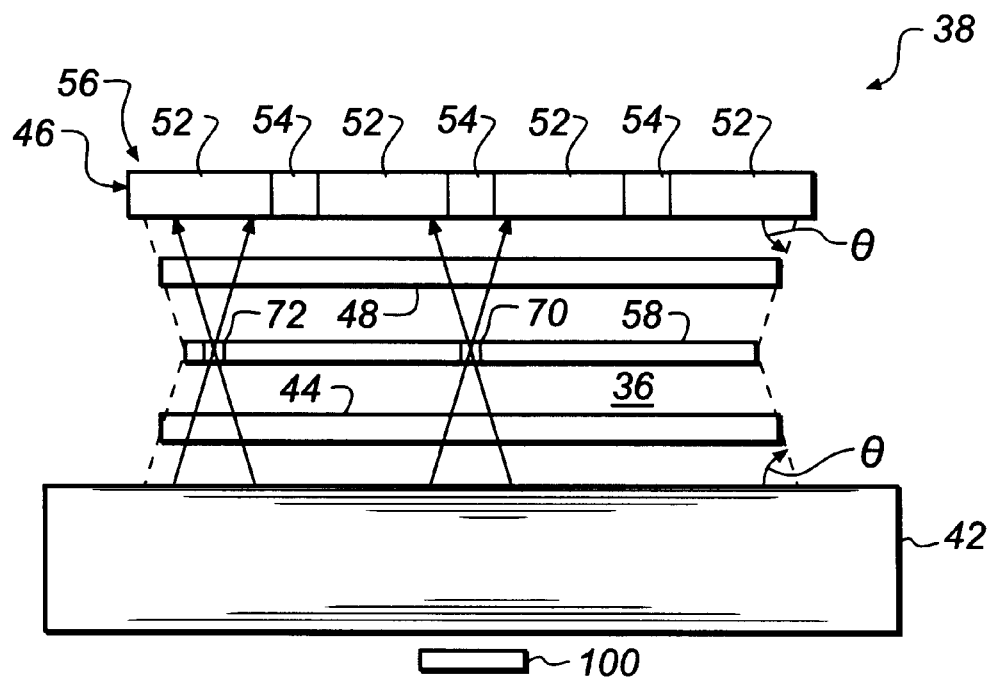
FIG. 3 is a front elevation of the measuring apparatus of FIG. 2.

The construction and operation of the scanner stage 12 will now be described with reference to FIGS. 2 and 3. A sheet of film with a maximum width of 550 mm leaves the nip of three driven exit rollers 30 of the dryer stage 10 of the processor and travels along a path 32 between entrance guides 34 into a channel 36 of a scanner 38, and exits freely over a guide 40. A fluorescent tube 42 is mounted below the channel 36 and light therefrom is directed upwards through an aperture plate 44. The aperture extends 590 mm transversely of the channel and 3 mm therealong in the direction of travel of the film. A linear light sensor array 46 is mounted above the channel 36 and extends parallel to the tube 42 and receives light that has travelled through the aperture plate 44 and across the film path 32. The array 46 is 610 mm wide and extends 3 mm along the length of the channel 36. The amount of light falling on the sensor array 46 is further defined by a sensor aperture plate 48, whose aperture is parallel to the aperture of the tube plate 44, that is of the same width, but that has a slightly larger length of 5 mm. A pair of clear windows 50 physically close the apertures of the plates 44 and 48 on respective sides of the channel 36. The sensor array 46 is provided by a continuous length of solar cell strip. The strip of the array is scored transversely to divide it into four relatively long discrete main sensor sections 52 interspersed with three relatively short discrete subsidiary sensors 54. A separate output signal is obtained from each of the subsidiary sensors 54 and also from each of the sensor sections 52. The summed output from the sensor sections 52 and the subsidiary sensors 54, which together define a main sensor 56, provides a single main sensor output signal. The relative widths, i.e. dimensions transversely of the channel 36, of the tube 42, plate apertures 44, 48, and sensors 52 and 56 are shown in FIG. 3 with reference to the maximum width of film 58 that can be measured by the scanner 38. Thus, as can be seen from FIG. 3, only part of the width of the main sensor 56 is covered by the film 58. However, by appropriate choice of number, size and positioning, at least one of the subsidiary sensors 54 is always arranged to be fully covered by the film as it passes through the stripe of light from the tube 42. In many applications, and particularly in the graphic arts, the leading, and trailing, edge of a film has a uniform transmittance across its length and also for a sufficient length, say about 10 mm, for a fully-covered subsidiary sensor 54 to make a measurement of the transmittance. It will be understood that this will be the case irrespective of whether the transmittance is very high, if the leading edge is unexposed, or very low, if the leading edge is fully exposed. Furthermore, as the leading edge of the film 58 passes into the light beam in the channel 36 there is a drop in the signal from the main detector 56, even if the leading edge is unexposed.

The determination of the width of the film 58 will now be described. The transmittance of the leading edge of the film 58 is determined from the output of the, or each, subsidiary sensor 54 that is fully covered by measuring the signal from that sensor in the absence of any film in the channel, the open gate value $S_o$, and measuring the signal, $S_{LE}$, in the presence of the leading edge (i.e. a non-image-bearing portion) of the film. The transmittance, $T_{LE}$, is then obtained from:

$$T_{LE} = S_{LE}/S_o \quad 1)$$

The signal received by the main sensor 56 is then noted under the open gate condition, $M_o$, and when the leading edge of the film 58, is in the scanner gate, $M_{LE}$. The general expression for the signal from the main sensor, M, is given by:

$$M = M_{EDGE} + M_{CENTRE} \quad 2)$$

where $M_{EDGE}$ is the portion of the signal arising from light striking the sensor towards its edges where the response of the scanner is not uniform and $M_{CENTRE}$ is the portion of the signal from the centre of the scanner where the response is uniform. The scanner is so designed that it is wider than the maximum possible film width, $W_{MAX}$, and light contributing to $M_{EDGE}$ is never modulated by the passage of film through the scanner. $M_{EDGE}$ is therefore a constant and its value is determined as part of the scanner calibration, by measuring M with a piece of black film of maximum width in the scanner channel. In the uniform centre portion of the scanner, the general expression for the signal produced by a piece of film of width W and containing a high contrast image comprising black and clear regions is given by:

$$M_{CENTRE} = \frac{M_{CO}}{W_{MAX}} \int_0^{W_{MAX}} T(x) dx \quad 3)$$

where x is the distance from one edge of the central portion across the scanner perpendicular to the film transport direction, $M_{CO}$ is the value of $M_{CENTRE}$ when there is no film in the scanner and T(x) is the transmittance of the film at x. Since the transmittance is 1 where there is no film, this expression simplifies to:

$$M_{CENTRE} = \frac{M_{CO}}{W_{MAX}} \left\{ W_{MAX} - W + \int^{film} T(x) dx \right\} \quad 4)$$

when the leading edge of the film is in the scanner, it is assumed that it has uniform transmittance across its width, $T_{LE}$. We may therefore write, where $M_{LE}$ is the signal from the main sensor when the leading edge is in the scanner gate, $$M_{LE} = M_{EDGE} + \frac{M_{CO}}{W_{MAX}} (W_{MAX} - W(1 - T_{LE})) \quad 5)$$

to give an expression for the film width, W. We recognise that the open gate signal from the main sensor, $M_o$, is equal to the sum of $M_{EDGE}$ and $M_{CO}$. Thus, equation 5) may be rearranged to give an expression for W:

$$W = \frac{W_{MAX}}{(1 - T_{LE})} \cdot \frac{(M_O - M_{LE})}{(M_O - M_{EDGE})} \quad 6)$$

The apparatus also includes a reference light detector cell 100 that is arranged to receive the output from the fluorescent tube 42. Ratiometric measurements between signals from the sensors 52, 54 and the reference cell 100 are used in known manner to ensure that the effects of drift in the output of the tube 42 and other long-term variations are minimised.

The scanning apparatus 38 described can also be used to measure the amount, i.e. mass, of image-forming substance on the film 58. For graphic arts film, this mass is proportional to the so-called "black area" of the film. For continuous tone images, the relation between image amount and measurements of image density is more complicated and depends on several factors. These factors and the methods for converting integrated transmittance measurements into image amount will be well-known to persons skilled in the art and may be found for example in "The Theory of the Photographic Process" by James, 4th Edition.

For graphic arts applications, an integrated measurement may be made of the fractional area of the film which is covered with image. The scanner 38 can be "zeroed" on the film base, that is to say on an unexposed area of the film, by measuring the base transmittance by means of the subsidiary sensors 54. In the case where the leading, or trailing, edge of the film 58 is exposed, and thus cannot be used for determination of the base density, the base density is determined from that signal from any one of the subsidiary sensors 54 from any portion of the film which gives the lowest value for the transmittance. The lowest values from successive films, or sheets, may be stored. If subsequently a film 58 is scanned that does not contain any unexposed area at all, then a recent historical average value is used as an approximation.

During scanning of film 58 by the scanner 38, the signal from each of the subsidiary sensors 54 and the main sensor 56 is stored in a memory at regular sampling intervals, preferably such that the distance travelled by the film between each sample is much less than the length of the aperture plates in the direction of travel of the film.

To determine the total black area on the film sheet, each of the raw scanned data points is converted to black area according to equation (7) below and stored in another memory location correcting for the base transmittance of the film and for the maximum and minimum possible sample values corresponding to the width of the film being scanned.

Equation 4) may be rearranged given that the strip of film being scanned may be thought of as a black piece of length b and zero transmittance and a clear piece of length (W-b) with transmittance, $T_{BASE}$, to give $$M = M_O - \frac{(M_O - M_{EDGE})}{W_{MAX}} \cdot \{W \cdot (1 - T_{BASE}) + b \cdot T_{BASE}\} \quad 7)$$

This expression may be rearranged to give a value for b. The value for $T_{BASE}$ is obtained either from the measurement by a subsidiary sensor of the transmittance of the leading edge (if it is not exposed) or from an area of minimum density somewhere in the film or from the historical average or from an estimate based on typical film characteristics. Usually the value of $T_{BASE}$ will be close to 1. The effective black area of the sample in the scanner gate is then simply given by $$B = b.s.t \quad 8)$$

where s is the transport speed and t is the sample interval. The fractional black area of the sample is simply the ratio, b/W.

The converted data is then summed to provide a single number that is representative of the fractional area of the film that is black. For graphic arts films, the mass of silver in the image is readily obtained by multiplying the total black area of the film by the silver laydown of the film, the latter being a known quantity for the film type in use, available from the manufacturer or from analytical measurement.

It will be appreciated that there are design compromises to be made with respect to the number and angle of view of the subsidiary sensors 54. It is advantageous for each subsidiary sensor 54 to measure the base transmittance over a fairly large area to obtain a good average value. If too small an area is used, the measured value may be unrepresentative of the average. On the other hand, if too large an area is used, it is more likely that the film being scanned, if it is of narrow width, will not completely cover the field of view of one of the subsidiary sensors 54. In this case, the value measured will imply a transmittance which is greater than the true value, and the calculated film width will then be too large.

The scanner 38 uses a fluorescent tube which has the advantages of low cost and high light output. A disadvantage is that the light emitted is very diffuse. The solar cell detector arrangements also have a wide angle of acceptance for detected light. This is disadvantageous because edge effects are increased. To minimise this the light from the fluorescent tube may be partially collimated. This can be done with a neutral density filter which acts to reduce the intensity of the off-axis light more than the on-axis light. It can also be done using light collimating sheet, available, for example from the 3M company, which has thin black louvers incorporated into the sheet which allow on-axis light to pass but which block the off-axis component. Ideally, the sheet should be put across the whole of the sensor arrangements so that the subsidiary sensors 54 have the same response as the main sensor 56. Alternatively, to save cost, the collimating film may be placed only over the subsidiary sensors 54 and a calibration factor added to the algorithm used to convert the subsidiary sensor 54 and main sensor 56 measurements of leading edge transmittance into a film width.

Aperture plates 44 and 48 are used above the light source 42 and below the sensor array 46 respectively to limit the width of the scanned areas across the film 58 to 3 mm, for example. For accurate measurements it is important that the apertures have a uniform width, for example 3 mm, all the way along their length. However, in the case of graphic arts film, where the film width may be over 1 meter, the aperture width may vary, due to the weight of unsupported material, especially at the centre of the aperture. It has been discovered that using a diffuse light source, where the aperture plates 44, 48 are located away from the film 58 being scanned by a small amount, it is possible physically to connect one side of the aperture to the other by thin bridges without casting significant shadows on the film 58. This provides greatly improved rigidity to the aperture plates 44, 48 such that the thickness of material used to make the plates may be reduced. This also reduces the cost and weight of the apparatus and reduces sensitivity to vibration and non-uniformities arising from thermal expansion.

The invention also allows any reduced sensitivity at the edges of the scanner to be counteracted. Referring to FIG. 3, a small area 70 in the centre of the film 58 receives light from a wide angle, and all of this light passes through the sensor aperture plate 48 and reaches the sensor array 46. This is also the case for a small area 72 at the edge of the film 58, since the apertures in the plates 44 and 48 are arranged to be wider than the film 58, and the tube 42 and sensor array 46 are arranged to be wider than the plate apertures. Thus with the scanner 38, a small black area 72 of film 58 at the edge of the field of view blocks the same amount of light from reaching the array 46 as would the same size area 70 in the centre of the film 58.

The relative dimensions of the scanner components may be determined geometrically, based on the angle, $\theta$, subtended on the sensor array 46 by a line through the edge of the film 58 and the edge of the aperture of the plate 48. The angle $\theta$, which may be determined experimentally or by calculation, is the angle which reduces the edge effects to a level acceptable to the operator, and thus depends on the accuracy desired of the scanner 38.

Figure 4:
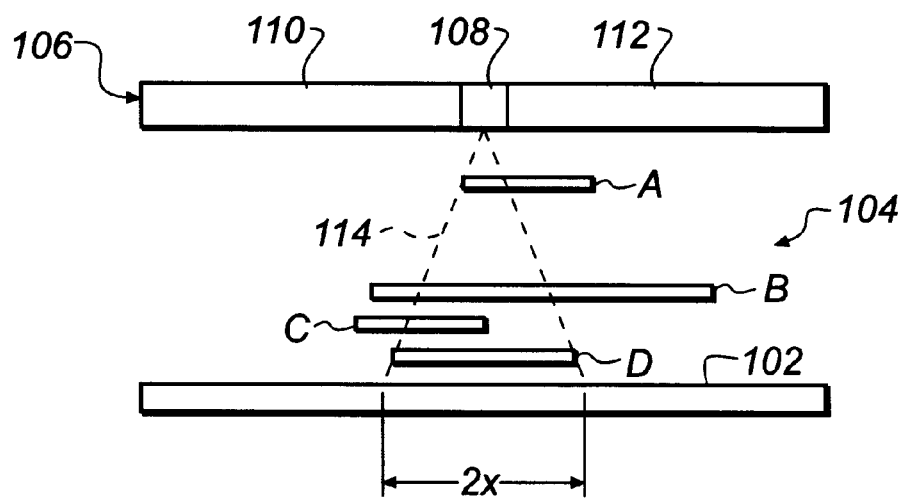
FIG. 4 is a schematic drawing of a view looking into the entrance of film sensing equipment.

Referring to FIG. 4, a fluorescent tube (not shown) directs light through a lower aperture plate 102 across an entrance channel 104 of the equipment, and the light is received by a sensing arrangement 106. The sensing arrangement 106 comprises a subsidiary, or small area, sensor 108 and a pair of larger area, main, sensors 110 and 112 that are located co-linearly on either side of the sensor 108.

Four cases are represented in the drawing, showing films A, B, C and D of various widths (films A and C being of the same width), disposed in planes at various spacings from the aperture plate 102 and sensing arrangement 106, and in various locations transversely of the channel 104, as might be experienced in practice.

In order that the subsidiary sensor 108 can provide a valid signal representing the transmittance of the films A to C, its angle of view, by which is meant the angle within which the significant majority of incident light is received, represented by the dotted conical outline 114, has to be fully obscured by the film from light from the tube. The value of the angle of view of the sensor is selected to provide the required accuracy of width measurement. For example, if it is desired to measure film leading edge transmittance to within 5%, it is necessary to select the angle of view such that at least 95% of the light detected by the sensor is incident within the angle of view. In accordance with the present invention, an indication of the positioning of the film over the sensor 108 is determined from the drop in signal from the main sensors 110 and 112 on either side thereof.

It will be appreciated that although only a single subsidiary sensor 108 is shown in FIG. 4, in practice a plurality would be provided, and three is the preferred number, each having a main sensor on each side thereof.

As can be seen from the figure, films A, B and D totally fill the angle of view 114 of the sensor 108, and accordingly would produce an accurate transmittance measurement. It is also seen that this is not the case for film C. For film C, therefore, the transmittance would have to be obtained in some other manner.

For practical considerations, the specification of the sensing apparatus of FIG. 4 would set out the narrowest film width that it can handle. This is normally determined by the expected minimum width of the material processed through the associated photographic processor. The distance 2x, being the projected length of the angle of view 114 of the sensor 108 on the lower aperture plate 102, must then be less than the specified minimum film width in order that an accurate transmittance can be obtained.

The operation of the sensing equipment will now be described.

The transmittance is measured by the subsidiary sensor 108 in a conventional manner. This is done by determining the ratio of the amount of light received by the sensor 108 in the presence of a film in the channel 104 to that received in the absence of the film in the channel 104.

If none of the measured transmittances is less than the maximum possible if the film were totally clear, then all of the measurements are invalid, and consequentially the width of the film cannot be calculated. This is so because none of the subsidiary sensors 108 would then even be partially covered by the film.

At the other extreme, the transmittance calculated from any subsidiary sensor 108 that has another subsidiary sensor 108 on each side thereof, separated by a distance of at least 2x, is reliable if the signals from the adjacent subsidiary sensors 108 both show a reduction in value in the presence of a film in the channel 104. This is because each of the adjacent subsidiary sensors 108 must be at least partially obscured by the film, so that the intermediate sensor 108 consequentially must be totally obscured by the film, it being assumed that the field of view of the subsidiary sensors do not overlap.

The situation will now be considered in which only one or two (i.e. not three or more) of the subsidiary sensors 108 show a reduction of value when the film passes into the scanning equipment. In this case, it is still not known whether the single sensor or both of the sensors 108 are covered fully by the film. The transmittance, $T_{LE}$, of the leading edge of the film is determined from the single affected sensor 108, or from the one of the two affected sensors 108 having the greater drop in signal in the conventional manner. It is then assumed that the plane of the film in the channel 104 is in the worst position for sensor coverage, which is at the furthest possible spacing away from the subsidiary sensor 108. It will be appreciated, that for any given film width, the closer its plane is to the sensing arrangement 106, the greater the chance is that it will fully obscure one subsidiary sensor 108. Thus, the worst case is for the film D in FIG. 4, being at its furthest practicable spacing from the subsidiary sensor 108. A calculation is then made of the drop in the light signal from each of the main sensors 110 and 112, S1 and S2 respectively assuming that the film is of length 2x and is positioned symmetrically under the subsidiary sensor so as to just fully obscure it. This is done by noting that half the light passing through the film in this limiting case reaches S1 and half reaches S2, given that the subsidiary sensor is assumed small compared with x. (If this latter approximation is not true, a correction to the simplified calculation presented below may readily be made). Thus, the drop in signal of S1 and S2 for the film of length 2x located furthest away will be the same as for a film of length x positioned symmetrically immediately next to the sensor with no separation. Using this equivalence, the following equation is then obtained:

$$S_{imax}=(S_{iog}/L_i)\cdot(L_i-x\cdot[1-T_{LE}])$$

where i represents 1 or 2, $S_{imax}$ is the maximum value of $S_i$ as determined by the calculation of the limiting case $S_{iog}$ is the value of $S_i$ when there is no film in the channel 104(open gate), and $L_i$ is the length of the main sensor, $S_i$.

If the actual measured signal from either main sensor 110 or 112 is greater than $S_{imax}$, then the transmittance measurement obtained from the subsidiary sensor 108 is determined to be unreliable because the film may not have been fully covering the sensor 108.

It should be noted that the film A of FIG. 4, which passes through the scanning equipment at a higher plane than films B, C and D, would produce an accurate transmittance as measured by the subsidiary sensor 108, since its angle of view 114 is fully covered, but would be determined unreliable from the comparison with $S_{imax}$. This is because the offset of the film A from the centre line of the sensing equipment could result in a drop in the signal received by the main sensor 110 being insufficient. Thus, the criteria for reliability based on $S_{imax}$ gives rise to a low "false positive" error rate but at the expense of a higher "false negative" error rate. In other words, the measurement in respect of film A would be rejected whereas in fact it is accurate. The false negative error can be reduced by increasing the number of the small area subsidiary sensors 108. However, this has the disadvantage of increasing the cost of the equipment, taking into account that more electronic signal processing channels would be required for the increased number of main and subsidiary sensors, and more memory would be required for data storage, carrying with it need for a higher processing speed in order to process the data in real time. A practical compromise has been found to be to provide three small area sensors 108, and thus four of larger area sensors 110, 112.

The invention has been described in detail with particular reference to preferred embodiments thereof, but it will be understood that variations and modifications can be effected within the spirit and scope of the invention as set forth in the claims.

PARTS LIST 1. processor
4. developer stage
6. fixer stage
8. wash stage
10. dryer stage
12. scanner stage
14. line
16. line
18. replenishment unit
20. replenishment unit
22. line
24. filter unit
26. line
28. silver recovery unit
30. roller
32. film path
34. entrance guide
36. channel
38. scanner
40. guide
42. fluorescent tube
44. aperture plate
46. light sensor array
48. aperture plate
50. window
52. sensor section
54. sensor
56. sensor
58. film
70. area of film
72. black area
100. reference cell
102. aperture plate
104. entrance channel
106. sensing arrangement
108. sensor
110. sensor
112. sensor
114. angle of view

What is claimed is:

1. A method of measuring the width of a sheet of material that (i) has an image-bearing portion, and (ii) has a non-image-bearing portion that is of substantially uniform optical density across substantially the entire width of the sheet, wherein:

the sheet is guided longitudinally through a channel;

light from an elongate source is directed into the channel substantially perpendicularly to the direction of movement of the sheet;

said light is received (i) by an elongate main sensor arrangement whose length is greater than the width of the sheet, and whose response to the light is substantially uniform across the width of the sheet; and (ii) by an elongate subsidiary sensor arrangement whose length is less than 90% of the width of the sheet;

wherein the transmittance, or reflectance, of the non-image-bearing portion of the sheet is determined from the difference of an output signal of the subsidiary sensor arrangement when (i) the sheet is in the channel and the light received is from the non-image-bearing portion, and (ii) the light received thereby is in the absence of the sheet in the channel; and wherein the width of the sheet is determined from the measured transmittance, or reflectance, and from the difference of the output signal of the main sensor arrangement when (i) the sheet is in the channel and the light received is from the non-image-bearing portion, and (ii) the light received thereby is in the absence of the sheet in the channel.

2. A method according to claim 1, wherein the light is directed onto one side of the sheet, and the sensor arrangements are located on the other side thereof so as to receive light transmitted through the sheet.

3. A method according to claim 1, wherein the subsidiary sensor arrangement comprises a plurality of discrete sensors, and wherein the difference in time between the leading edge of the sheet beginning to obscure a first and then at least one other of said subsidiary sensors is determined, and wherein a correction is applied to the measured width thereby to compensate for any errors therein due to the sheet being skewed in the channel.

4. A method according to claim 1, wherein input sensors of an associated photographic processor provide a signal representative of any skew angle of the sheet in the channel, and wherein said signal is used to correct the sheet width as determined from the output of the sensor arrangements.

5. A method of controlling a photographic processor, wherein a sheet of material is processed in the processor and passed therefrom into apparatus for determining the width of the sheet, the width of the sheet is determined by a method according to claim 1, a first signal dependent on the width of the sheet material is used to derive a second signal that is representative of the area of the sheet, and wherein said second signal is used in the control of the operation of the processor.

6. A method according to claim 5, wherein the subsidiary sensor arrangement is arranged to measure the base transmittance or reflectance of the sheet.

7. A method according to claim 6, wherein the base measurement is made from a non-image-bearing leading or trailing edge portion of the sheet.

8. A method according to claim 6, wherein the base measurement is made from that part of the image-bearing portion of the sheet which has the lowest optical density.

9. A method according to claim 6, wherein the light transmitted through, or reflected by, an image-bearing portion of the sheet is measured by the main sensor arrangement, wherein that measured value is adjusted by the measured value of the base transmittance, or reflectance, wherein a third signal is derived from the adjusted value that is representative of the mass of image-forming substance on the sheet, and wherein the third signal is used in the control of the operation of the processor.

10. A method according to claim 5, wherein the second signal is arranged to control (i) replenishment of processing chemicals that are consumed in at least one stage of the processor, and/or (ii) recovery of silver from the processor, and/or (iii) replacement of a filter of the processor.

11. A method according to claim 5, wherein successive first signals are stored, and, in the absence of an output from at least one of the sensor arrangements, a signal derived from said stored signals is used in the control of the operation of the processor.

12. A method according to claim 1, wherein the width measurement is made from a non-image-bearing leading or trailing edge of the sheet.

13. A method according to claim 1, comprising the step of measuring the light transmitted through, or reflected from, image-bearing sheets of variable widths, wherein the main light-sensing arrangement comprises two main sensors and the subsidiary sensor arrangement comprises an associated subsidiary sensor, wherein the subsidiary sensor is arranged to measure the transmittance, or reflectance, of the sheets, wherein the main and subsidiary sensors are mounted across the width of the sheets as they pass through the channel (a) with the subsidiary sensor being located intermediate the two main sensors, or (b) with the main sensors abutting one another and with the subsidiary sensor displaced therefrom along the direction of movement of the sheet and located symmetrically with respect to the abutment of the main sensors; wherein the signal output of each of the main sensors is measured in the presence of a sheet in the channel, wherein the expected signal output of each of the main sensors from the sheet is calculated on the assumptions that (i) the sheet is located in the channel at the furthest position away from the sensors and that (ii) the width of the sheet across the channel is such that the subsidiary sensor is substantially obscured from the light source, and wherein said calculated values are compared with said actual values, thereby to determine the reliability of the transmittance, or reflectance, of the sheet, as measured by the subsidiary sensor.

14. A method according to claim 13, wherein more than two main and more than one associated subsidiary sensors are provided, and wherein said transmittance, or reflectance, is measured by each of said subsidiary sensors, wherein the reliability of each measured transmittance, or reflectance, is determined by carrying out said comparison in respect of the two main sensors associated with each subsidiary sensor.

15. A method of replenishing at least one stage of a photographic processor processing image-bearing sheets, wherein the amount of replenishment chemicals supplied to said stage is controlled in accordance with the width of the processed sheets as determined in accordance with claim 1.

16. Apparatus for measuring the width of a sheet of material that (i) has an image-bearing portion, and (ii) has a non-image-bearing portion that is of substantially uniform optical density across substantially its entire width, comprising:

a channel for receiving the sheet;

an elongate source of light arranged to direct light into the channel;

means for guiding the sheet through the channel whereby the sheet receives light transversely to the plane thereof;

means defining an optical aperture of predetermined minimum width for passage of the light across the channel transversely to the direction of transport of the sheet;

an elongate main light sensor arrangement whose length is equal to or greater than said minimum width of the optical aperture and whose response to the light is substantially uniform across the width of the sheet, and an elongate subsidiary light sensor arrangement whose length is less than 90% of said minimum width of the optical aperture, the sensor arrangements being mounted so as to receive transmitted, or reflected, light from the sheet in the channel;

means for determining the transmittance, or reflectance, of the sheet from light received by the subsidiary sensor arrangement when (i) the sheet is in the channel and the light received is from the non-image-bearing portion, and (ii) the light received thereby is in the absence of the sheet in the channel; and means for determining the width of the sheet from (a) light received by the main sensor arrangement when (i) the sheet is in the channel and the light received is from the non-image-bearing portion, and (ii) the light received thereby is in the absence of the sheet in the channel, and (b) from the measured transmittance, or reflectance.

17. Apparatus according to claim 16, wherein at least one of the sensor arrangements comprises a plurality of discrete sensors.

18. Apparatus according to claim 16, wherein the subsidiary sensor arrangement forms part of the main sensor arrangement.

19. Apparatus according to claim 16, wherein the means defining the optical aperture comprises a first transverse elongate aperture through which light from the source is arranged to reach sheet material in the channel, and/or a second transverse elongate aperture through which light from the sheet is arranged to reach the main and subsidiary sensor arrangements.

20. Apparatus according to claim 16, wherein the light source and the sensor arrangements are mounted on opposite sides of the channel, whereby the light received by the sensor arrangements is transmitted through the sheet.

21. Apparatus for processing a sheet of photographic material, wherein the processed sheet is supplied to width-measuring apparatus according to claim 16, and wherein means is arranged to control operation of the processing apparatus in accordance with the measured width.

22. Apparatus according to claim 16, wherein the light source, optical aperture, and main and subsidiary sensor arrangements are mounted such that the optical axial plane is substantially perpendicular to the direction of transport of the sheet through the channel.

23. Apparatus according to claim 16 wherein the height of the channel, in a direction perpendicular to the plane of the sheet, is greater than about 5 mm, preferably greater than about 10 mm.

24. Apparatus according to claim 16, comprising support means for extending across the optical aperture for supporting the optical aperture defining means, thereby to maintain the optical aperture at a substantially constant width along its entire length, said support means being arranged substantially not to interfere with the light received by the sensor arrangements from the channel.

* * * * *